(12) United States Patent
Josefsson et al.

(10) Patent No.: US 9,666,334 B2
(45) Date of Patent: May 30, 2017

(54) FIELD GRADING LAYER

(71) Applicant: NEXANS, Paris (FR)

(72) Inventors: Staffan Josefsson, Gothenburg (SE);
Bjorn Sonerud, Gothenburg (SE);
Knut Magne Furuheim, Fredrikstad (NO)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/751,462

(22) Filed: Jun. 26, 2015

(65) Prior Publication Data

US 2015/0380128 A1 Dec. 31, 2015

(30) Foreign Application Priority Data

Jun. 30, 2014 (EP) .................................. 14 306 059

(51) Int. Cl.

| | | |
|---|---|---|
| *H02G 15/00* | (2006.01) | |
| *H01B 7/00* | (2006.01) | |
| *H01B 9/00* | (2006.01) | |
| *H01B 1/22* | (2006.01) | |
| *H01B 1/24* | (2006.01) | |
| *H01B 9/02* | (2006.01) | |
| *H01B 13/08* | (2006.01) | |
| *C08K 3/22* | (2006.01) | |
| *H01B 3/44* | (2006.01) | |
| *H02G 15/068* | (2006.01) | |
| *H02G 15/188* | (2006.01) | |
| *C08K 3/14* | (2006.01) | |
| *C08K 3/20* | (2006.01) | |

(Continued)

(52) U.S. Cl.
CPC ............... *H01B 9/006* (2013.01); *C08K 3/14* (2013.01); *C08K 3/20* (2013.01); *C08K 3/22* (2013.01); *C08K 5/14* (2013.01); *C08K 7/24* (2013.01); *H01B 1/22* (2013.01); *H01B 1/24* (2013.01); *H01B 3/441* (2013.01); *H01B 9/027* (2013.01); *H01B 13/08* (2013.01); *H02G 15/068* (2013.01); *H02G 15/188* (2013.01); *C08K 2201/001* (2013.01)

(58) Field of Classification Search
CPC . H01B 1/22; H01B 1/24; H01B 9/027; C08K 2201/001; H02G 15/068; H02G 15/188
USPC ............................................ 174/73.1, 120 SC
See application file for complete search history.

(56) References Cited

U.S. PATENT DOCUMENTS 3,644,662 A * 2/1972 Salahshourian ..... H02G 15/068
174/127
6,124,549 A * 9/2000 Kemp .................. H02G 15/068
174/73.1

(Continued)

OTHER PUBLICATIONS

Search Report dated 2015.

*Primary Examiner* — Sherman Ng
(74) *Attorney, Agent, or Firm* — Sofer & Haroun, LLP

(57) ABSTRACT

A method is provided for applying a field grading layer to a power cable includes preparing a polymer composition having a polymer matrix, at least one conductive filler different from a non-linear conductive organic filler, and at least one crosslinking agent. The method includes extruding the polymer composition into a crosslinkable field grading tape and winding the crosslinkable field grading tape onto a section of power cable in need of field grading. The crosslinkable tape is crosslinked to obtain a field grading layer.

18 Claims, 2 Drawing Sheets

(51) Int. Cl.
*C08K 5/14* (2006.01)
*C08K 7/24* (2006.01)

(56) References Cited

U.S. PATENT DOCUMENTS

| | | | |
|---|---|---|---|
| 6,417,265 B1* | 7/2002 | Foulger | C08L 23/06 |
| | | | 524/495 |
| 7,632,574 B2* | 12/2009 | Kensicher | C08J 3/226 |
| | | | 174/110 PM |
| 2006/0145119 A1* | 7/2006 | Onneby | B82Y 30/00 |
| | | | 252/62.3 R |
| 2007/0199729 A1* | 8/2007 | Siegel | C08K 3/22 |
| | | | 174/73.1 |
| 2007/0272428 A1 | 11/2007 | Bayon et al. | |
| 2010/0139974 A1* | 6/2010 | Christen | H02G 15/184 |
| | | | 174/84 R |
| 2010/0147556 A1 | 6/2010 | Jonsson et al. | |
| 2011/0168427 A1* | 7/2011 | Smedberg | C08F 10/02 |
| | | | 174/120 R |
| 2013/0284486 A1* | 10/2013 | Nilsson | H01B 3/441 |
| | | | 174/107 |
| 2014/0166335 A1 | 6/2014 | Kagoura et al. | |
| 2014/0182886 A1 | 7/2014 | Sonerud et al. | |
| 2015/0171566 A1* | 6/2015 | Chen | H01R 13/6581 |
| | | | 439/607.01 |

* cited by examiner

FIELD GRADING LAYER

RELATED APPLICATION

This application claims the benefit of priority from European Patent Application No. 14 306 059.8, filed on Jun. 30, 2014, the entirety of which is incorporated by reference.

BACKGROUND

Field of the Invention

The present invention relates to a method for applying a field grading layer to a cable, a cable comprising said field grading layer, a crosslinkable field grading tape, and the use of said method or said crosslinkable field grading tape on a cable termination or a cable joint.

The present invention relates more particularly to a field grading layer applicable for high voltage terminations and factory and repair joints for direct current (DC) applications. These field joints are applicable for instance in subsea connections.

Description of Related Art

Field grading layers are commonly used in alternating current (AC) and direct current (DC) accessories including cables to control the electric field.

To obtain the field grading effect, the field grading layer is made of a material having a resistivity that depends on the strength of the electric field, wherein this dependence can be linear or non-linear.

The material of the field grading layer can comprise an insulating polymer matrix, non-linear or linear conductive elements, and optionally additional conductive elements which do not have field grading properties.

At cable joints/terminations, not only the conductors must be connected but also the field grading layers must be terminated and connected to ground and to the high voltage conductor.

US2010/0147556 describes a field grading material comprising a dielectric polymer matrix such as EPDM rubber (ethylene propylene diene monomer), a plurality of micro varistor particles, and a plurality of other conductive particles referred to as bridging particles. The resistivity of the varistor particles strongly depend on the strength of the electric field, whereas the bridging particles do not have this field dependency but influences the general conductivity of the field grading material. The varistor particles accordingly provide the non-linear properties, whereas the bridging particles provide electrical "bridges" between the varistor particles. The exemplified varistor particles are inorganic particles of SiC and ZnO. Examples of bridging particles include carbon black, and inorganic oxides such as $TiO_2$, antimony doped $SnO_2$. However, US2010/0147556 does not describe the method to prepare the field grading material and apply it to a power cable.

WO 2004/038735 describes a field grading material consisting of a polymeric matrix and an inorganic filler such as ZnO, SiC, $Al_2O_3$, $TiO_2$ or $BaTiO_3$. The polymeric matrix of the field grading material consists of polyolefin rubber or thermoplastic polyolefin elastomer/plastomer, preferably including EPDM rubber or silicone rubber. However, the application method is not disclosed in details.

In the cable industry, a common method to prepare a termination or a premolded joint including a resistive control system (i.e. field grading system) is to compound a field grading material comprising at least one elastomer matrix and a conductive filler having field grading properties and then, to mold said field grading material into a premolded joint or termination. The field grading material can also be molded as a tube which can be slipped onto the cable end or joint area. Indeed, low and medium voltage accessories generally include a resistive control system either as separate resistive control tubing, or integrated as resistive control coating in an insulating tubing. However, said methods include at least one molding step which is generally performed at high temperature (e.g. above 200° C. for several hours) and therefore, can give rise to thermal stress on the conductive filler and reduce its field grading properties. In addition, the adhesion and electrical contact of the field grading layer with the insulation of the power cable is not optimized.

Indeed, the adhesion between the field grading layer and the insulation of the power cable relies on pressure and involves the presence of air at the interface between the field grading layer and the insulation, and therefore of partial discharges. To avoid said partial discharges and to enable the field grading layer to slide easily on the power cable, a sliding oil may be used to fill the voids of air at the interface which reduces the adhesion. Further, adhesion and electrical contact have a strong relation and it is wished to have a good electrical contact between the insulation layer and a field grading layer.

Accordingly, it still exists a need for an alternative field grading layer application method which induces less thermal stress on the conductive filler (especially if it is an organic filler) and which improves adhesion and electrical contact to the insulation of the power cable. Indeed, the application of a field grading layer to a cable termination or joint by ensuring physical contact between the insulation of said cable and said field grading layer is of high importance for the transfer of surface charge.

OBJECTIVES AND SUMMARY

An aim of the present invention is to provide an alternative method for preparation and application of a field grading layer.

Further, the method should be applicable for applying one or more field grading layers at cable terminations and joints.

The method of applying field grading layers should provide means of fast, robust, and simple application of a field grading layer to a cable termination or joint.

A further objective is to provide improved adhesion between the conductive filler and the polymer matrix.

It is also an objective to improve the adhesion between the insulation layer of the cable and the field grading layer.

A first object of the present invention is a method of applying a field grading layer to a power cable comprising the following steps:
  i) preparing a polymer composition comprising a polymer matrix, at least one conductive filler different from a non-linear conductive organic and at least one crosslinking agent,
  ii) extruding the polymer composition into a crosslinkable field grading tape,
  iii) winding the crosslinkable field grading tape onto a section of power cable in need of field grading, and
  iv) crosslinking the crosslinkable field grading tape to obtain a field grading layer.

The conductive filler of the present invention has field grading properties.

Examples of non-linear conductive organic fillers (which are excluded from the present invention) are polyaniline emeraldine base (PANI-EB), polyaniline emeraldine salt (PANI-ES) or a mixture thereof.

The conductive filler can be a linear or non-linear inorganic conductive filler, or a linear conductive organic filler, and preferably a non-linear inorganic conductive filler.

The linear or non-linear inorganic conductive filler may be selected from metal oxides, ceramics, carbon nanotubes, SiC, graphene oxide, and mixtures thereof.

The linear or non-linear inorganic conductive filler is preferably selected from metal oxides, ceramics, SiC, and mixtures thereof.

Examples of metal oxides and/or ceramics are ZnO, $FeO_2$, $TiO_2$, $Al_2O_3$, $BaTiO_3$, $SnO_2$, or mixtures thereof.

$SbO_2$ is also an example of metal oxide according to the invention.

In a particular embodiment, the linear or non-linear inorganic conductive filler is selected from SiC, ZnO, $FeO_2$, $TiO_2$, $Al_2O_3$, $BaTiO_3$, $SnO_2$, $SbO_2$ and mixtures thereof.

The linear organic conductive filler may be selected from intrinsically conducting polymers such as polyaniline, polyacetylene, polyphenylene vinylene, polypyrrole, polythiophene, or polyphenylene sulfide.

The conductive filler of the invention is preferably SiC, ZnO or $SbO_2$, and more preferably ZnO or $SbO_2$ due to their higher non-linearity.

The polymer matrix is non-conductive (i.e. insulative).

The polymer composition prepared in step i) can further comprise one or more passive conductive fillers which influences the general conductivity but which do not contribute to the linear or non-linear dependency, that-is-to-say to the field grading properties of the field grading layer.

Examples of such passive conductive fillers include carbon black or antimony doped $SnO_2$.

In one aspect of the invention, the polymer matrix is selected from polyolefins, copolymers thereof, polymethyl(methacrylate) (PMMA), and mixtures thereof.

The polyolefins are preferably selected from the group consisting of polypropylene (PP), polyethylene (PE), low density polyethylene (LDPE), cross-linked polyethylene (XLPE), and mixtures thereof, and more preferably selected from the group consisting of PE, LDPE, XLPE, and mixtures thereof.

In a preferred embodiment, the polymer matrix does not contain any elastomer. In other words, the polymer matrix is different from an elastomer matrix.

In a preferred embodiment, the polymer matrix is LDPE and the outer surface of the section of the power cable in need of field grading is made of XLPE. Here, the XLPE is applied to the power cable as an insulation layer.

In one preferred aspect of the method of the present invention, the at least one conductive filler is a linear or non-linear inorganic conductive filler selected from metal oxides, ceramics, carbon nanotubes, SiC, graphene oxide, and mixtures thereof, and more preferably selected from SiC, ZnO, $FeO_2$, $TiO_2$, $Al_2O_3$, $BaTiO_3$, $SnO_2$, $SbO_2$ and mixtures thereof.

The polymer composition can comprise from 10% to 50%, and preferably from 20% to 40% by volume of conductive filler.

The polymer composition can comprise from 20% to 70% by weight of polymer matrix.

In yet another aspect of the method, the at least one crosslinking agent is an organic peroxide, and preferably a dialkyl peroxide.

Examples of dialkyl peroxides include dicumyl peroxide, tert-butyl cumyl peroxide, di(tert-butylperoxyisopropyl) benzene, di-tert-butyl peroxide, and mixtures thereof.

Dicumyl peroxide is preferred.

In a further aspect, a first section of the power cable comprises an insulation layer, and the crosslinking of the crosslinkable field grading tape results in crosslinkage to the insulation layer.

In one aspect of the method according to the present invention, the crosslinking step iv) is performed by heating, where the heating time necessary to obtain the crosslinking is significantly reduced compared to crosslinking a traditional applied elastomer matrix-based field grading layer.

Thanks to the method of the present invention, the field grading layer has good electrical contact with the entire length of the termination or the joint, due to the improved adhesion to the insulation layer of the cable.

The field grading layer applied thanks to the method of the invention can be considered as a fine tuning of the surface resistance of the cable insulation to a desirable level, which then controls the tangential field and reduce charge that builds up on the surface over the termination or the joint.

A second object of the present invention is a power cable comprising a central conductor, an insulation layer surrounding the central conductor, an inner semiconducting layer arranged in between the central conductor and the insulation layer, and on a first section of the power cable a field grading layer on the outer surface of the insulation layer, wherein the field grading layer comprises a polymer matrix and at least one conductive filler different from a non-linear conductive organic filler, wherein said field grading layer is crosslinked internally and crosslinked to the insulation layer.

The conductive filler and the polymer matrix are as defined in the first object of the present invention.

In another aspect of the power cable according to the present invention, the power cable on a second section comprises an outer semiconducting layer arranged radially outside the insulation layer, and wherein the field grading layer is in electrical contact with the outer semiconducting layer and in electrical contact with the central conductor.

As it is well known for a person skilled in the art, the field grading layer needs to be in electrical contact with a grounded outer semiconducting layer arranged radially outside the insulation layer on the part of the cable not supplied with the field grading layer. Further, the field grading layer is in electrical contact with the high voltage potential conductor. This allows the field grading layer to evenly distribute the electric field.

A third object of the present invention is a crosslinkable field grading tape comprising a polymer matrix, at least one conductive filler different from a non-linear conductive organic filler, and at least one crosslinking agent.

The conductive filler and the polymer matrix are as defined in the first object of the present invention.

In one aspect of the invention, the polymer matrix is selected from the group comprising polyolefins, co-polymers thereof, polymethyl(methacrylate) (PMMA), and mixtures thereof, and more preferably selected from the group comprising polypropylene (PP), polyethylene (PE), low density polyethylene (LDPE), cross-linked polyethylene (XLPE), and mixtures thereof.

The crosslinking agent can be an organic peroxide, and preferably a dialkyl peroxide.

Examples of dialkyl peroxides include dicumyl peroxide, tert-butyl cumyl peroxide, di(tert-butylperoxyisopropyl) benzene, di-tert-butyl peroxide, and mixtures thereof.

Dicumyl peroxide is preferred.

A fourth object of the present invention is the use of the method according to the present invention or the crosslinkable field grading tape according to the present invention to provide a field grading layer on a subsea cable termination and/or a subsea cable joint.

The term "field grading" as used here in the terms "field grading tape" and "field grading layer" refers to the field grading properties of the tape or layer. The "field grading" has a non-linear or a linear conductivity which provides active control of the electrical field.

Accordingly, the term "field grading layer" describes the use of a layer with non-linear or linear field dependent conductivity to actively control the electric field.

The terms "non-linear conductive inorganic filler", "linear conductive inorganic filler", and "linear conductive organic filler" as used here refers to an organic or an inorganic compound with a non-linear or a linear conductivity dependence with the electric field. Accordingly, the non-linear conductive inorganic filler, and/or the linear conductive inorganic filler, and/or the linear conductive organic filler is(are) the active(s) compound(s) in the polymer composition of step i) providing the field grading properties. As an example, the conductivity of the conductive filler of the invention depends on an electric field and may in a simplified way be written as follows:

$$\sigma(E) = \sigma_0 \left(1 + \left(\frac{E}{E_{th}}\right)^{2\alpha}\right)$$

in which $\sigma$ is the conductivity at an electric field E, $\sigma_0$ is the conductivity at a zero electric field $E_0$, $E_{th}$ is the electric field threshold, and $\alpha$ is the coefficient of linearity or non-linearity. If the coefficient $\alpha$ is equal to zero, then the dependence of the conductivity is zero with respect to the electric field, thus acting as an ideal resistance. If the coefficient $\alpha$ is different from zero, the dependence is non-linear. A linear dependence of the conductivity with respect to the electric field is found when the coefficient $\alpha$ is equal to 1.

The "passive conductive filler" as used here refers to a compound which can be either organic or inorganic and which provides conductivity but which does not contribute to the field grading properties of the polymer composition.

The term "tape" as employed here refers to a flat band of material which can be applied to a cable with a generally circular circumference by winding the tape onto the surface of the cable or a part thereof.

BRIEF DESCRIPTION OF THE DRAWINGS

The enclosed figures illustrate one embodiment of the present invention.

For reasons of clarity, the same elements are designed by identical references. Similarly, only those elements that are essential for understanding the invention are shown in diagrammatic manner, and scale is not complied with.

DETAILED DESCRIPTION

Figure 1:
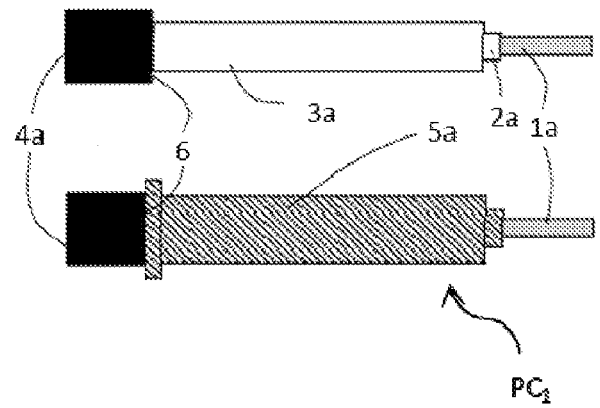
FIG. 1a illustrates a cable termination prior to the application of a crosslinkable field grading tape according to one embodiment of the present invention.
FIG. 1b illustrates the same cable termination as FIG. 1a but after a crosslinkable field grading tape according to the present invention has been applied to the cable termination.

The present invention will now be described in further details. Compounding and especially molding and/or crosslinking a conductive filler having field grading properties in an elastomer matrix according to the prior art method for preparing premolded joints or stress cones, can induce stress to the conductive filler and reduce the field grading properties of the conductive filler. Indeed, when molding the elastomer matrix containing the conductive filler, a high temperature has to be maintained for a long time (often more than one hour) to achieve crosslinking. One reason for this is that premolded joints are quite large and the thermal inertia of the system causes the temperature to be maintained for an extended time. In addition, the adhesion between the obtained field grading layer and the insulation(s) is not optimized.

According to one aspect of the present invention, a crosslinkable field grading tape is produced by preparing a polymer composition comprising at least one conductive filler different from a non-linear conductive organic filler, a polymer matrix such as low density polyethylene (LDPE) matrix, and at least one crosslinking agent, said polymer composition being then extruded into said tape.

Thus, the crosslinkable field grading tape is formed of an extruded polymer composition comprising a polymer matrix, at least one conductive filler different from a non-linear conductive organic filler, and at least one crosslinking agent.

This crosslinkable field grading tape is according to this aspect of the present invention applied to an element, such as a power cable, in need of a field grading layer and then, easily crosslinked. The thin crosslinkable field grading tape can be crosslinked with in a considerable shorter time period (5-20 minutes) which induces less thermal stress on the conductive filler than the molding and crosslinking of a conductive filler in an elastomer matrix or a polymer matrix according to the prior art. In addition, the adhesion between the field grading layer and the insulation(s) is improved.

In one aspect of the present invention, the polymer matrix used for the crosslinkable field grading tape is of the same type or equivalent to the polymer employed in the insulation layer of the power cable or the joint, thereby improving the compatibility and the adhesion of the different parts. The insulation layer is preferably made of crosslinked polyethylene (XLPE) or low density polyethylene (LDPE).

The polymer of the insulation layer may further comprise a peroxide to facilitate the crosslinking.

Making a crosslinkable field grading tape instead of molding an elastomer matrix-based composition makes it possible to use application techniques well known from the manufacturing of factory joints using for example crosslinked polyethylene (XLPE) tape. This reduces the time during which the conductive filler is subjected to high temperature during application, allowing a higher degree of non-linearity or linearity to remain through crosslinking (step iv)) and compounding (i.e. step i)). Crosslinking also ensures good adhesion between the cable insulation layer and the crosslinkable field grading tape and some amount of crosslinking will also occur between the crosslinkable field grading tape and the previously extruded and eventually crosslinked insulation layer. Thus, the crosslinking of the crosslinkable field grading tape induces chemical bonding with great adhesion of the field grading layer to the insulation layer of the power cable.

In one embodiment of the present invention, a crosslinkable field grading tape is obtained by preparing a polymer composition comprising LDPE, at least one peroxide, and one or more conductive fillers different from a non-linear conductive organic filler, and extruding said polymer composition.

Applicable peroxides include but are not limited to organic peroxides, more specifically dialkyl peroxides.

Examples of dialkyl peroxides include, but not limited to, dicumyl peroxide, tert-butyl cumyl peroxide, di(tert-butylperoxyisopropyl)benzene, di-tert-butyl peroxide, and mixtures thereof.

In the manufacturing process of factory joints used in subsea high voltage cables, an extruded crosslinkable field grading tape in which the polymer matrix is polyethylene, is used. This polyethylene with peroxides for crosslinking is modified into a field grading layer by adding at least one conductive filler having field grading properties in the form of metal oxides, ceramics, carbon nanotubes, SiC, graphene oxide, and mixtures thereof, and more preferably in the form of SiC, ZnO, $FeO_2$, $TiO_2$, $Al_2O_3$, $BaTiO_3$, $SnO_2$, $SbO_2$ and mixtures thereof. This crosslinkable field grading tape is then applied to the cable, heated to initiate crosslinking.

The crosslinking step i) can be performed at a temperature ranging from about 150° C. to about 250° C., and preferably from about 170° C. to about 210° C., and optionally during from about 5 min to about 60 min, and preferably from about 10 to about 30 min.

After application, conventional terminations, premolded joints or factory joints can be applied on top of the insulation layer of the cable.

FIGS. 1a and 1b illustrates schematically a cable termination making use of the present invention. FIG. 1a illustrates a power cable $PC_1$ comprising a central conductor (1a), radially surrounded by an inner semiconducting layer (2a), surrounded radially by and insulation layer (3a) which initially is surrounded radially with an outer semiconducting layer (4a). To allow for termination of the cable, the outer semiconducting layer (4a) has been removed from a part of the illustrated end section of the cable. At the termination end also, a section of the insulation layer (3a) and the inner semiconducting layer (2a) have been removed providing a section of the conductor (1a) for electrical connection.

As an example, a polymer composition comprising LDPE, an organic peroxide, and a conductive filler having field grading properties is prepared so as to obtain a crosslinkable field grading tape. In the termination, the crosslinkable field grading tape would be applied as indicated below in FIG. 1b, forming the field grading layer (5a). A conventional stress cone for AC terminations can then be mounted on top of the field grading tape layer (5a). As illustrated, the field grading layer (5a) is in electrical contact with the outer semiconducting layer (4a) at the end (6a) of the outer semiconducting layer (4a).

The conductor (1a) can consist of a multitude of individual copper or aluminum conductors.

The outer semiconducting layer (4a) and/or the inner semiconducting layer (2a) can be made of a polymer filled with carbon particles.

Application of a field grading material as a cross-bonded tape as compared with elastomer matrix has the following advantages:
 excellent adhesion between the insulation layer (3a) and the field grading layer (5a),
 simpler application process as there is no need to mold a separate accessory, and
 less thermal stress on the conductive filler during preparation of the crosslinkable field grading tape and crosslinking as compared with preparing a premolded accessory The present invention is especially a feasible technique for joints and terminations for subsea cables, which benefit from the improved field grading properties.

Figure 2:
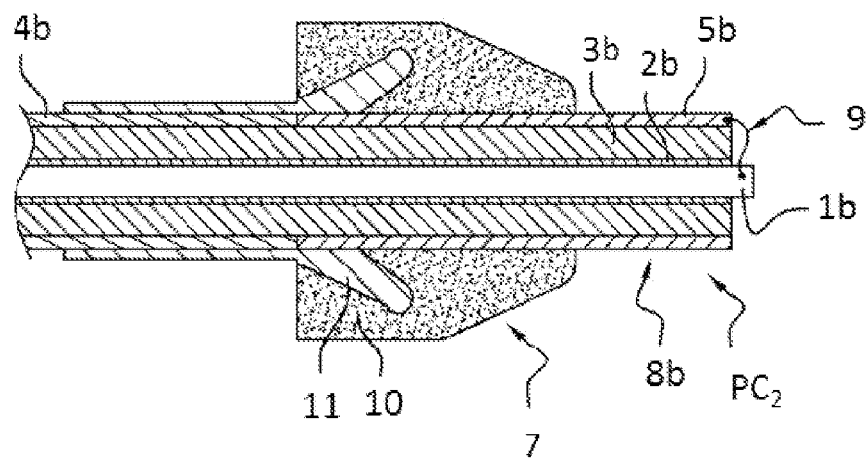
FIG. 2 represents a longitudinal cross sectional view of a power cable comprising a field grading layer according to the invention, and a termination.

FIG. 2 represents a power cable $PC_2$ positioned in a termination (7), the termination (7) surrounding the power cable $PC_2$.

The power cable comprises a central conductor (1b), surrounded successively by an inner semiconducting layer (2b), an insulation layer (3b), and an outer semiconducting layer (4b).

At the end (8b) of the power cable, a field grading layer (5b) replaces a part of the outer semiconducting layer (4b) of the power cable, so that the layer (5b) longitudinally extends in the prolongation from the outer semiconducting layer (4b) to said end (8b).

Hence, said layer (5b) surrounds and is physically in contact with the insulation layer (3b) of the power cable $PC_2$.

In addition, the field grading layer (5b) is electrically connected to the central conductor (1b) by a conducting connection (9).

The termination (7) includes:
 a stress cone body (10), and
 a deflector (11).

The stress cone body (10) surrounds a part of the field grading layer (5b), the stress cone body (10) being an electrically insulating body. The deflector (11) is a semiconducting cone surrounding a part of the outer semiconducting layer (4b) and a part of the field grading layer (5b). The deflector (11) is physically in contact with the outer semiconducting layer (4b) of the power cable, and in physically in contact with the field grading layer (5b). Hence, at least inside the termination (7), the field grading layer (5b) separates the insulation layer (3b) from the deflector (11).

Figure 3:
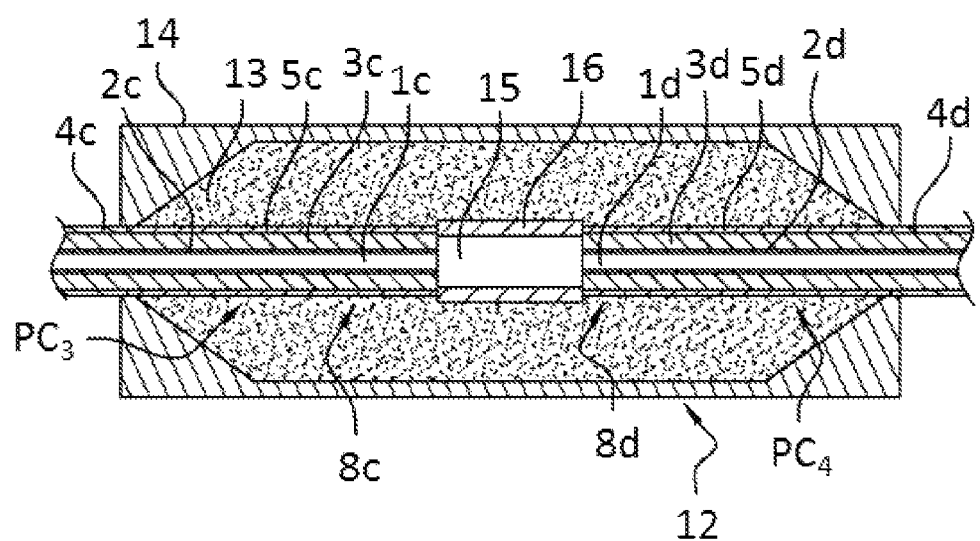
FIG. 3 represents a longitudinal cross sectional view of a power cable comprising a field grading layer according to the invention, and a junction.

FIG. 3 represents a first power cable $PC_3$ and a second power cable $PC_4$, positioned in a junction (12), the junction (12) surrounding each power cable ($PC_3$, $PC_4$).

Both power cables ($PC_3$, $PC_4$) respectively comprise a central conductor (1c, 1d), surrounded successively by an inner semiconducting layer (2c, 2d), an insulation layer (3c, 3d), and an outer semiconducting layer (4c, 4d).

At the end (8c, 8b) of each power cable ($PC_3$, $PC_4$), a field grading layer (5c, 5d) replaces a part of the outer semiconducting layer (4c, 4d) of the power cable ($PC_3$, $PC_4$), so that the layer (5c) longitudinally extends in the prolongation from the outer semiconducting layer (4c) to the end (8c) of the first power cable, and the layer (5d) longitudinally extends in the prolongation from the outer semiconducting layer (4d) to the end (8d) of the second power cable.

Hence, said layer (5c, 5d) surrounds and is physically in contact with the insulation layer (3c, 3d) of each power cable ($PC_3$, $PC_4$).

The junction (12) includes:
 an insulation of premolded joint (13),
 an outer semiconducting screen (14), and
 a connector (15) surrounded by a conducting screen (16), to electrically connect the first power cable and the second power cable together in the junction (12).

The insulation (13) surrounds all the field grading layers (5c) and (5d), the premoulded joint being an electrically insulating joint.

The outer semiconducting screen (14) surrounds a part of the outer semiconducting layers (4c, 4d) of said power cables, and a part of the field grading layers (5c, 5d). The outer semiconducting screen (14) is physically in contact with the outer semiconducting layers (4c, 4d) of the power cables ($PC_3$, $PC_4$), and in physically in contact with the field grading layers (5c, 5d). Hence, at least inside the junction (12), the field grading layer (5c) separates the insulation layer (3c) from the outer semiconducting screen (14), and the field grading layer (5d) separates the insulation layer (3d) from the semiconducting screen (14).

The connector (15) allows to electrically connect the central conductor (1c) of the first power cable $PC_3$ with the central electrical conductor (1d) of the second power cable $PC_4$.

In addition, the field grading layers (5c, 5d) are electrically connected to the central conductors (1c, 1d) by the intermediate of the connector (15) surrounded by its conducting screen (16).

The invention claimed is:

1. Method of applying a field grading layer to a power cable, said method comprising the steps of:
    i) preparing a polymer composition comprising a polymer matrix, at least one conductive filler different from a non-linear conductive organic filler, and at least one crosslinking agent,
    ii) extruding the polymer composition into a crosslinkable field grading tape,
    iii) winding the crosslinkable field grading tape onto a section of power cable in need of field grading, and
    iv) crosslinking the crosslinkable tape to obtain a field grading layer.

2. Method according to claim 1, wherein the polymer matrix is selected from polyolefins, copolymers thereof, polymethyl(methacrylate), and mixtures thereof.

3. Method according to claim 2, wherein the polyolefins are selected from the group consisting of polypropylene (PP), polyethylene (PE), low density polyethylene (LDPE), cross-linked polyethylene (XLPE), and mixtures thereof.

4. Method according to claim 1, wherein the at least one conductive filler is selected from metal oxides, ceramics, carbon nanotubes, SiC, graphene oxide, and mixtures thereof.

5. Method according to claim 1, wherein the polymer composition further comprises at least one passive conductive filler.

6. Method according to claim 5, wherein the at least one passive conductive filler is selected from carbon black and antimony doped $SnO_2$.

7. Method according to claim 1, wherein the at least one crosslinking agent is an organic peroxide.

8. Method according to claim 1, wherein a first section of the power cable has an insulation layer, and the crosslinking of the crosslinkable field grading tape results in crosslinkage to the insulation layer.

9. A sub-sea cable, wherein said subsea cable includes a field grading layer applied according to the method of claim 1.

10. Method according to claim 1, wherein the polymer matrix is different from an elastomer matrix.

11. Method according to claim 1, wherein the power cable comprises a central conductor, an insulation layer surrounding the central conductor, an inner semiconducting layer arranged in between the central conductor and the insulation layer, and on a first section of the power cable a field grading layer on the outer surface of said insulation layer, wherein the field grading layer comprises said polymer matrix and said at least one conductive filler different from a non-linear conductive organic filler, and wherein said field grading layer is crosslinked internally and crosslinked to the insulation layer.

12. Method according to claim 11, wherein the power cable on a second section comprises an outer semiconducting layer, and wherein the field grading layer is in electrical contact with the outer semiconducting layer and in electrical contact with the central conductor.

13. Crosslinkable field grading tape formed of an extruded polymer composition comprising:
    a polymer matrix;
    at least one conductive filler different from a non-linear conductive organic filler; and
    at least one crosslinking agent.

14. Crosslinkable field grading tape according to claim 13, wherein said crosslinkable field grading tape further comprises at least one passive conductive filler.

15. Crosslinkable field grading tape according to claim 13, wherein the polymer matrix is selected from polyolefins, copolymers thereof, polymethyl(methacrylate), and mixtures thereof.

16. Crosslinkable field grading tape according to claim 15, wherein the polyolefins are selected from the group consisting of polypropylene (PP), polyethylene (PE), low density polyethylene (LDPE), cross-linked polyethylene (XLPE), and mixtures thereof.

17. Crosslinkable field grading tape according to claim 13, wherein the at least one conductive filler is selected from metal oxides, ceramics, carbon nanotubes, SiC, graphene oxide, and mixtures thereof.

18. A sub-sea cable, wherein, said subsea cable has a crosslinkable field grading tape according to claim 13.

* * * * *